United States Patent
Ohno

(10) Patent No.: US 12,413,413 B2
(45) Date of Patent: Sep. 9, 2025

(54) SIMILARITY DEGREE DERIVATION SYSTEM AND SIMILARITY DEGREE DERIVATION METHOD

(71) Applicant: NEC Corporation, Tokyo (JP)

(72) Inventor: Yoshiyuki Ohno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 126 days.

(21) Appl. No.: 18/288,586

(22) PCT Filed: May 13, 2021

(86) PCT No.: PCT/JP2021/018169
§ 371 (c)(1),
(2) Date: Oct. 27, 2023

(87) PCT Pub. No.: WO2022/239174
PCT Pub. Date: Nov. 17, 2022

(65) Prior Publication Data
US 2024/0214211 A1  Jun. 27, 2024

(51) Int. Cl.
*H04L 9/32* (2006.01)

(52) U.S. Cl.
CPC .............................. *H04L 9/3236* (2013.01)

(58) Field of Classification Search
CPC ............................ H04L 9/3236; G06F 16/31
See application file for complete search history.

(56) References Cited

U.S. PATENT DOCUMENTS

| | | | |
|---|---|---|---|
| 11,120,052 B1 * | 9/2021 | Ozen | G06F 16/9014 |
| 2014/0344195 A1 * | 11/2014 | Drew | G06F 16/35 |
| | | | 706/12 |
| 2017/0078286 A1 | 3/2017 | Hunt et al. | |
| 2017/0161375 A1 | 6/2017 | Stoica et al. | |
| 2017/0322930 A1 | 11/2017 | Drew | |
| 2018/0095941 A1 | 4/2018 | Ciabarra, Jr. et al. | |
| 2018/0181609 A1 | 6/2018 | Chen et al. | |

FOREIGN PATENT DOCUMENTS

| | | |
|---|---|---|
| JP | 2020-004107 A1 | 1/2020 |
| WO | 2021/038887 A1 | 3/2021 |

OTHER PUBLICATIONS

International Search Report for PCT Application No. PCT/JP2021/018169, mailed on Aug. 3, 2021.

\* cited by examiner

*Primary Examiner* — Sm A Rahman
(74) *Attorney, Agent, or Firm* — Sughrue Mion, PLLC

(57) ABSTRACT

The hash value calculation means 2, when obtaining multiple hash values obtained by applying multiple hash functions to individual elements of each set in multiple sets, obtains the multiple hash values for individual elements of each set, eliminating duplicate calculations of each hash function other than a predetermined hash function among the multiple hash functions with respect to multiple elements whose hash values obtained by the predetermined hash function match and which are equivalent. The minimum hash value identification means 3 identifies minimum hash value which is the minimum value of hash values for each individual hash function, for each set in the multiple sets. The similarity degree derivation means 4 derives, with respect to one or more pairs of sets obtained from the multiple sets, similarity degree of two sets that form a pair based on minimum hash values corresponding to individual hash functions.

11 Claims, 15 Drawing Sheets

FIG. 4

SET A

| ELEMENT | h1 |
|---|---|
| "the" | 389 |
| "highest" | 12 |
| "mountain" | 666 |
| "Fuji" | 920 |

SET B

| ELEMENT | h1 |
|---|---|
| "room" | 124 |
| "mountain" | 666 |
| "view" | 300 |

FIG. 5

WHOLE SET

| |
|---|
| "the" |
| "highest" |
| "mountain" |
| "Fuji" |
| "room" |
| "view" |

FIG. 6

SET A

| ELEMENT | h1 |
|---|---|
| "the" | 389 |
| "highest" | 12 |
| "mountain" | 666 |
| "Fuji" | 920 |

INDEX INFORMATION

| |
|---|
| 1 |
| 2 |
| 3 |
| 4 |

WHOLE SET

| | |
|---|---|
| 1 | "the" |
| 2 | "highest" |
| 3 | "mountain" |
| 4 | "Fuji" |
| 5 | "room" |
| 6 | "view" |

SET B

| ELEMENT | h1 |
|---|---|
| "room" | 124 |
| "mountain" | 666 |
| "view" | 300 |

| |
|---|
| 5 |
| 3 |
| 6 |

FIG. 7

| WHOLE SET | h2 | h3 | ... | hm |
|---|---|---|---|---|
| "the" | 56 | 143 | ... | 513 |
| "highest" | 323 | 902 | ... | 322 |
| "mountain" | 92 | 792 | ... | 30 |
| "Fuji" | 820 | 43 | ... | 325 |
| "room" | 329 | 469 | ... | 832 |
| "view" | 810 | 521 | ... | 292 |

FIG. 8

SET A

| ELEMENT | h1 | h2 | h3 | ... | hm |
|---|---|---|---|---|---|
| "the" | 389 | 56 | 143 | ... | 513 |
| "highest" | 12 | 323 | 902 | ... | 322 |
| "mountain" | 666 | 92 | 792 | ... | 30 |
| "Fuji" | 920 | 820 | 43 | ... | 325 |

SET B

| ELEMENT | h1 | h2 | h3 | ... | hm |
|---|---|---|---|---|---|
| "room" | 124 | 329 | 469 | ... | 832 |
| "mountain" | 666 | 92 | 792 | ... | 30 |
| "view" | 300 | 810 | 521 | ... | 292 |

FIG. 9

| | h1 | h2 | h3 | ... | hm |
|---|---|---|---|---|---|
| MINIMUM HASH VALUE IN SET A | 12 | 56 | 43 | ... | 30 |
| MINIMUM HASH VALUE IN SET B | 124 | 92 | 469 | ... | 30 |

FIG. 16

SET A

| ELEMENT | h1 | h2 | h3 | ... | hm |
|---|---|---|---|---|---|
| "the" | 389 | | | | |
| "highest" | | | | | |
| "mountain" | | | | | |
| "Fuji" | | | | | |

FIG. 17

SET A

| ELEMENT | h1 | h2 | h3 | ... | hm |
|---|---|---|---|---|---|
| "the" | 389 | 56 | 143 | ... | 513 |
| "highest" | | | | | |
| "mountain" | | | | | |
| "Fuji" | | | | | |

FIG. 18

SET A

| ELEMENT | h1 | h2 | h3 | ... | hm |
|---|---|---|---|---|---|
| "the" | 389 | 56 | 143 | ... | 513 |
| "highest" | 12 | 323 | 902 | ... | 322 |
| "mountain" | 666 | 92 | 792 | ... | 30 |
| "Fuji" | 920 | 820 | 43 | ... | 325 |

FIG. 19

SET B

| ELEMENT |
|---|
| "room" |
| "mountain" |
| "view" |

FIG. 20

SET A

| ELEMENT | h1 | h2 | h3 | ... | hm |
|---|---|---|---|---|---|
| "the" | 389 | 56 | 143 | ... | 513 |
| "highest" | 12 | 323 | 902 | ... | 322 |
| "mountain" | 666 | 92 | 792 | ... | 30 |
| "Fuji" | 920 | 820 | 43 | ... | 325 |

SET B

| ELEMENT | h1 | h2 | h3 | ... | hm |
|---|---|---|---|---|---|
| "room" | 124 | 329 | 469 | ... | 832 |
| "mountain" | 666 | | | | |
| "view" | | | | | |

FIG. 21

SET A

| ELEMENT | h1 | h2 | h3 | ... | hm |
|---|---|---|---|---|---|
| "the" | 389 | 56 | 143 | ... | 513 |
| "highest" | 12 | 323 | 902 | ... | 322 |
| "mountain" | 666 | 92 | 792 | ... | 30 |
| "Fuji" | 920 | 820 | 43 | ... | 325 |

SET B

| ELEMENT | h1 | h2 | h3 | ... | hm |
|---|---|---|---|---|---|
| "room" | 124 | 329 | 469 | ... | 832 |
| "mountain" | 666 | 92 | 792 | ... | 30 |
| "view" | | | | | |

FIG. 22

SET A

| ELEMENT | h1 | h2 | h3 | ... | hm |
|---|---|---|---|---|---|
| "the" | 389 | 56 | 143 | ... | 513 |
| "highest" | 12 | 323 | 902 | ... | 322 |
| "mountain" | 666 | 92 | 792 | ... | 30 |
| "Fuji" | 920 | 820 | 43 | ... | 325 |

SET B

| ELEMENT | h1 | h2 | h3 | ... | hm |
|---|---|---|---|---|---|
| "room" | 124 | 329 | 469 | ... | 832 |
| "mountain" | 666 | 92 | 792 | ... | 30 |
| "view" | 300 | 810 | 521 | ... | 292 |

SIMILARITY DEGREE DERIVATION SYSTEM AND SIMILARITY DEGREE DERIVATION METHOD

This application is a National Stage Entry of PCT/JP2021/018169 filed on May 13, 2021, the contents of all of which are incorporated herein by reference, in their entirety.

TECHNICAL FIELD

The present invention relates to a similarity degree derivation system, a similarity degree derivation method, and a computer-readable recording medium in which a similarity degree derivation program is recorded, for deriving similarity degree between sets.

BACKGROUND ART

By applying the same hash function to each element of a set, a hash value is obtained for each element. The minimum hash value may be referred to as MinHash. In this specification, the minimum value of the hash values obtained for each element based on the same hash function is referred to as the minimum hash value. When multiple hash functions are applied to each element of the aforementioned set, the same number of minimum hash values as hash functions are obtained.

It is also conceivable to apply common multiple hash functions to two sets, find multiple minimum hash values for each set, and determine the similarity degree of the two sets based on the multiple minimum hash values.

PTL 1 describes a method for searching for similar text using minimum hash values.

CITATION LIST

Patent Literature

PTL 1: Japanese Patent Application Laid-Open No. 2020-4107

SUMMARY OF INVENTION

Technical Problem

To determine the similarity degree of sets as in the previous example, multiple hash values must be obtained by applying multiple hash functions to each individual element of each set. This is because multiple minimum hash values must be obtained for each set. Here, it is assumed that the number of the sets is n. Also, for simplicity of explanation, it is assumed that the number of elements in each set is k in common. Also, it is assumed that the number of hash functions is m. In this case, the calculation of the hash value must be performed n*k*m times.

However, less computation of hash values is preferable.

Therefore an object of the present invention is to provide a similarity degree derivation system, a similarity degree derivation method, and a computer-readable recording medium in which a similarity degree derivation program is recorded, which can reduce the amount of calculation of hash values when deriving the similarity degree of sets.

Solution to Problem

A similarity degree derivation system according to the present invention includes: hash value calculation means for, when obtaining multiple hash values obtained by applying multiple hash functions to individual elements of each set in multiple sets, obtaining the multiple hash values for individual elements of each set, eliminating duplicate calculations of each hash function other than a predetermined hash function among the multiple hash functions with respect to multiple elements whose hash values obtained by the predetermined hash function match and which are equivalent; minimum hash value identification means for identifying minimum hash value which is the minimum value of hash values for each individual hash function, for each set in the multiple sets; and similarity degree derivation means for deriving, with respect to one or more pairs of sets obtained from the multiple sets, similarity degree of two sets that form a pair based on minimum hash values corresponding to individual hash functions.

A similarity degree derivation method according to the present invention includes: a hash value calculation process of, when obtaining multiple hash values obtained by applying multiple hash functions to individual elements of each set in multiple sets, obtaining the multiple hash values for individual elements of each set, eliminating duplicate calculations of each hash function other than a predetermined hash function among the multiple hash functions with respect to multiple elements whose hash values obtained by the predetermined hash function match and which are equivalent; a minimum hash value identification process of identifying minimum hash value which is the minimum value of hash values for each individual hash function, for each set in the multiple sets; and a similarity degree derivation process of deriving, with respect to one or more pairs of sets obtained from the multiple sets, similarity degree of two sets that form a pair based on minimum hash values corresponding to individual hash functions.

A computer-readable recording medium according to the present invention is a computer-readable recording medium in which a similarity degree derivation program is recorded, wherein the similarity degree derivation program causes a computer to execute: a hash value calculation process of, when obtaining multiple hash values obtained by applying multiple hash functions to individual elements of each set in multiple sets, obtaining the multiple hash values for individual elements of each set, eliminating duplicate calculations of each hash function other than a predetermined hash function among the multiple hash functions with respect to multiple elements whose hash values obtained by the predetermined hash function match and which are equivalent; a minimum hash value identification process of identifying minimum hash value which is the minimum value of hash values for each individual hash function, for each set in the multiple sets; and a similarity degree derivation process of deriving, with respect to one or more pairs of sets obtained from the multiple sets, similarity degree of two sets that form a pair based on minimum hash values corresponding to individual hash functions.

Advantageous Effects of Invention

According to the present invention, the amount of calculation of hash values can be reduced when deriving the similarity degree of sets.

BRIEF DESCRIPTION OF DRAWING

FIG. 4 It depicts a schematic diagram showing an example of the first hash values obtained for each individual element of each set A and B.

FIG. 5 It depicts a schematic diagram showing a whole set obtained from the sets A and B shown in FIG. 4.

FIG. 6 It depicts a schematic diagram showing an example of index information.

FIG. 7 It depicts a schematic diagram showing an example of hash values corresponding to each hash function h2, . . . , hm calculated by the second hash value calculation unit 54 for each element belonging to the whole set shown in FIG. 5.

FIG. 8 It depicts a schematic diagram showing an example of multiple hash values corresponding to multiple hash functions h1, h2, . . . , hm, determined for individual elements of each set.

FIG. 9 It depicts a schematic diagram showing the minimum hash value identified for each hash function for the sets A and B, respectively.

FIG. 16 It depicts a schematic diagram showing an example of a hash value obtained after first executing step S73.

FIG. 17 It depicts a schematic diagram showing an example of hash values obtained after first executing step S76.

FIG. 18 It depicts a schematic diagram showing an example of hash values obtained before it is determined that there are no unselected elements in step S77.

FIG. 19 It depicts a schematic diagram showing an example of one set in the multiple sets.

FIG. 20 It depicts a schematic diagram showing an example of hash values obtained after the element "mountain" in the set B is selected and step S73 is executed.

FIG. 21 It depicts a schematic diagram showing an example of hash values obtained after the execution of step S75 when the element "mountain" in the set B is selected.

FIG. 22 It depicts a schematic diagram showing an example of multiple hash values obtained for each element of each set.

DESCRIPTION OF EMBODIMENTS

Example embodiments of the present invention is described below with reference to the drawings. In each of the following example embodiments, it is assumed that the multiple sets have been previously input to the similarity degree derivation system of each example embodiment.

Example Embodiment 1

The first example embodiment is an example embodiment indicating an overview of the present invention. More specific matters are explained in the second and third example embodiments described below.

Figure 1:
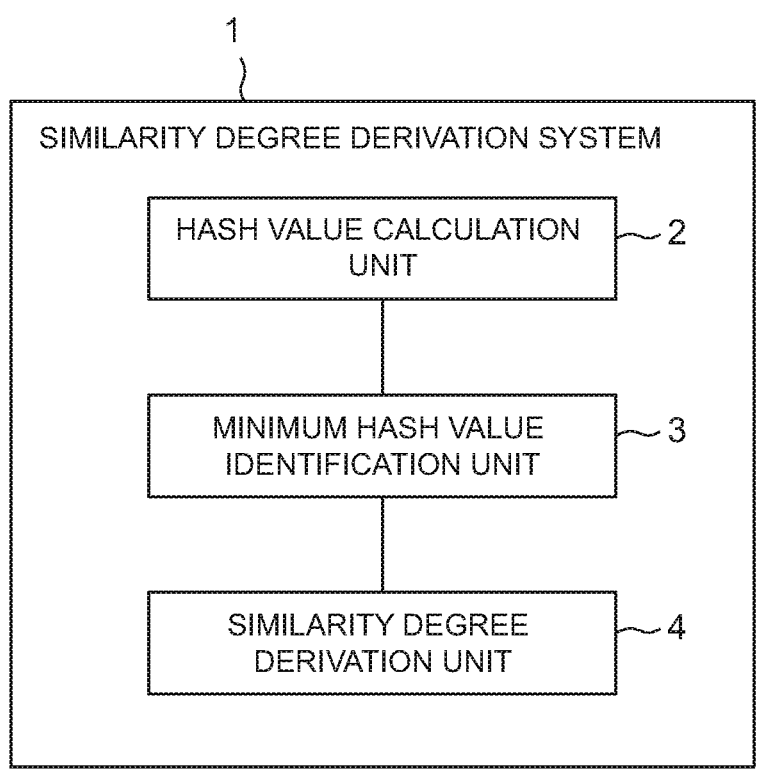
FIG. 1 It depicts a block diagram showing an example of a similarity degree derivation system of the first example embodiment of the present invention.

FIG. 1 is a block diagram showing an example of a similarity degree derivation system of the first example embodiment of the present invention. The similarity degree derivation system 1 includes a hash value calculation unit 2, a minimum hash value identification unit 3, and a similarity degree derivation unit 4.

The hash value calculation unit 2 obtains multiple hash values obtained by applying multiple hash functions to individual elements of each set in the multiple sets. However, for multiple elements whose hash values obtained by a predetermined hash function among the multiple hash functions match and which are equivalent (common), the hash value calculation unit 2 eliminates duplicate calculations of each hash function other than the predetermined hash function and obtains multiple hash values for individual elements in each set.

It is preferable to determine the hash function with the widest range among the multiple hash functions as the predetermined hash function. In other words, it is preferable that the predetermined hash function is the hash function with the widest range among the multiple hash functions.

The minimum hash value identification unit 3 identifies the minimum hash value which is the minimum value of hash values for each individual hash function, for each set in the multiple sets. For example, it is assumed that one set A is focused on. When a certain hash function is focused on, the hash values corresponding to the hash function are obtained for the number of elements in the set A. The minimum hash value identification unit 3 identifies the minimum value of those hash values as the minimum hash value corresponding to the hash function. The minimum hash value identification unit 3 identifies the minimum hash value for each of the other hash functions in the same manner. The minimum hash value identification unit 3 performs this process for each of the sets included in the multiple sets. As a result, for each set, the minimum hash value corresponding to each individual hash function is determined.

The similarity degree derivation unit 4 derives, with respect to one or more pairs of sets obtained from the multiple sets, the similarity degree of the two sets that form a pair based on the minimum hash values corresponding to the individual hash functions. For example, the similarity degree derivation unit 4 may calculate the similarity degree of two sets that form a pair with respect to all pairs (pairs of sets) obtained from the multiple sets.

The similarity degree derivation unit 4 may, for example, determine the number of matches between the minimum hash values corresponding to individual hash values as the similarity degree of the two sets that form a pair.

The hash value calculation unit 2, the minimum hash value identification unit 3, and the similarity degree derivation unit 4 are realized, for example, by a CPU (Central Processing Unit) of a computer operating according to a similarity degree derivation program. For example, the CPU may read the similarity degree derivation program from a program storage medium such as a program storage device of the computer, and operate as the hash value calculation unit 2, the minimum hash value identification unit 3, and the similarity degree derivation unit 4 according to the similarity degree derivation program.

Figure 2:
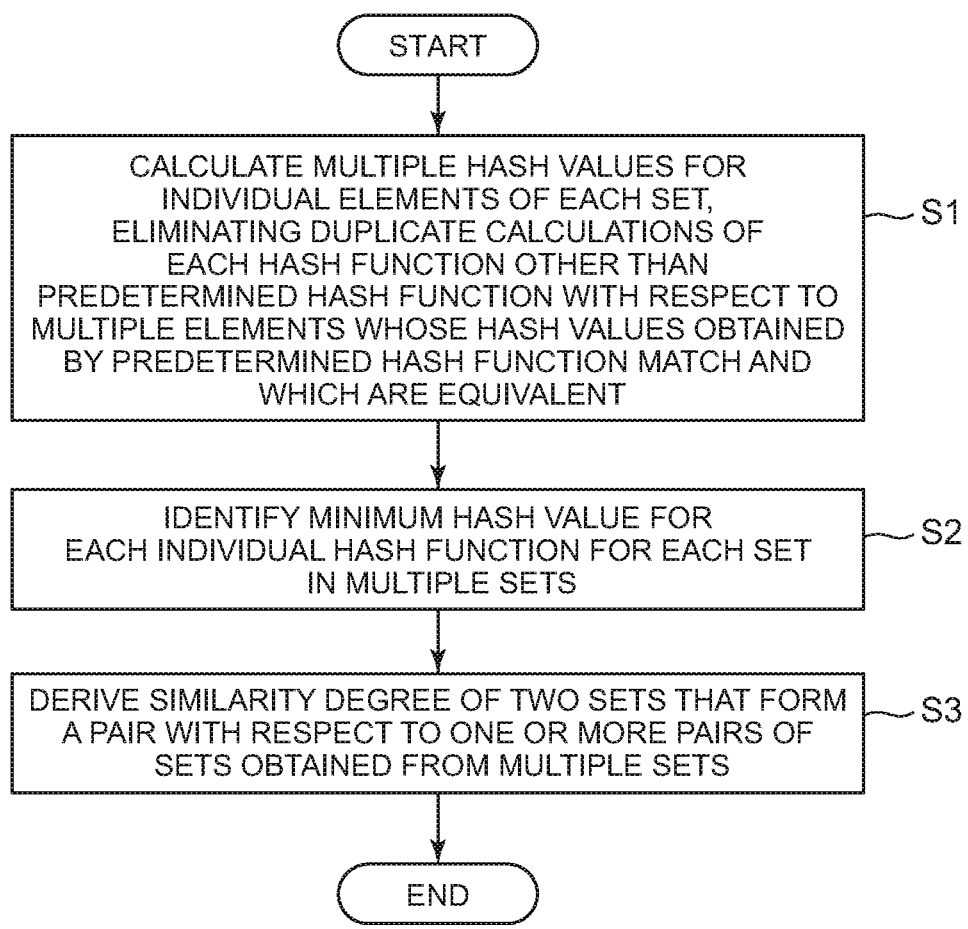
FIG. 2 It depicts a flowchart showing an example of the processing flow of the first example embodiment.

FIG. 2 is a flowchart showing an example of the processing flow of the first example embodiment. The explanation of matters that have already been explained are omitted as appropriate.

First, the hash value calculation unit 2 obtains multiple hash values for individual elements of each set, eliminating duplicate calculations of each hash function other than the predetermined hash function with respect to multiple elements whose hash values obtained by the predetermined hash function match and which are equivalent (step S1).

Next, the minimum hash value identification unit 3 identifies the minimum hash value for each individual hash function for each set in the multiple sets (step S2).

Next, the similarity degree derivation unit 4 derives the similarity degree of the two sets that form a pair with respect to one or more pairs of sets obtained from the multiple sets (step S3).

According to this example embodiment, the hash value calculation unit 2, when obtaining multiple hash values for individual elements of each set in the multiple sets, eliminates duplicate calculations of each hash function other than the predetermined hash function with respect to multiple elements whose hash values obtained by the predetermined hash function match and which are equivalent. Therefore, the same hash function is not repeatedly calculated for the multiple elements. Therefore, the amount of calculation of hash values can be reduced when deriving the similarity degree of sets.

Example Embodiment 2

Figure 3:
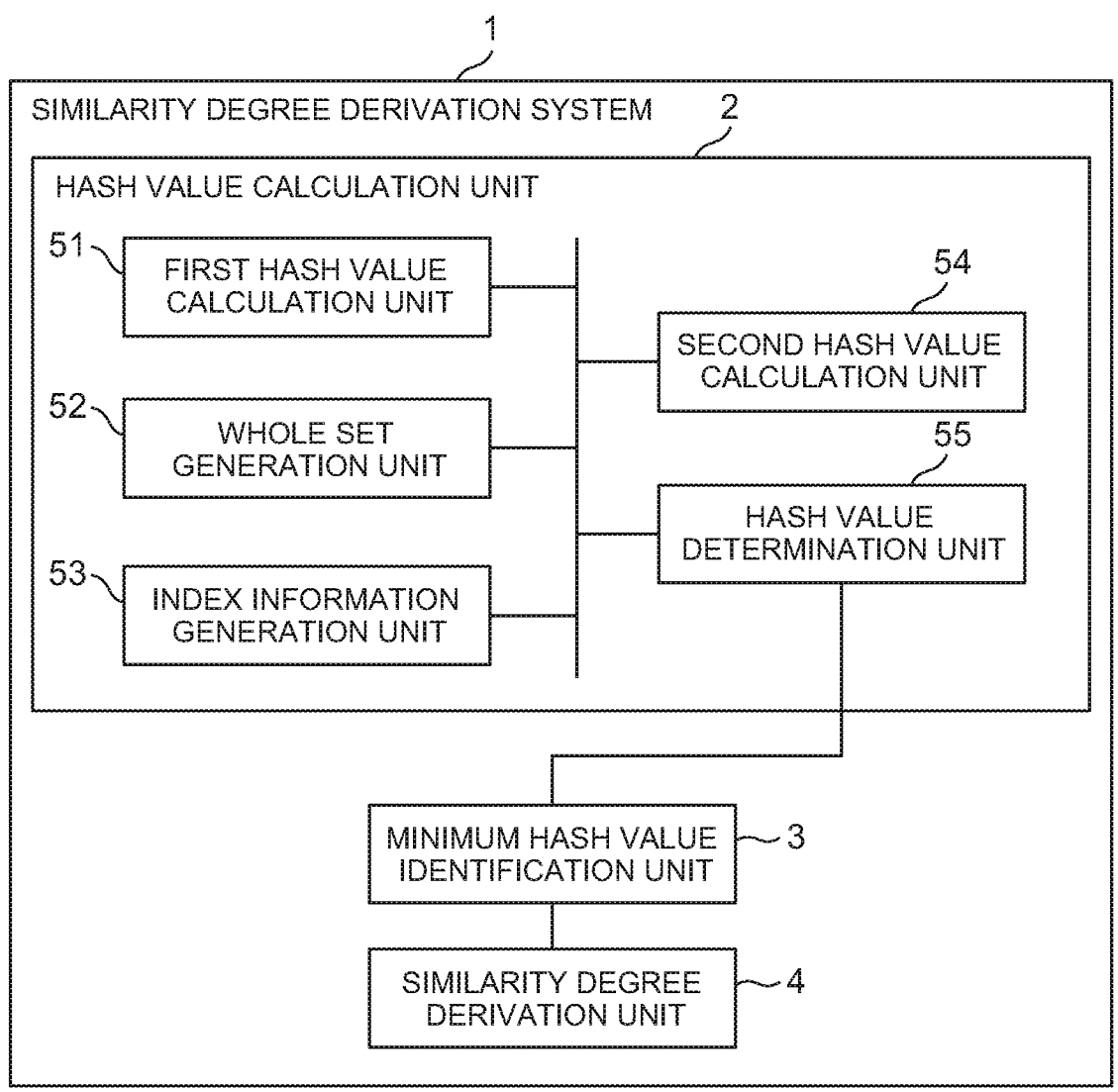
FIG. 3 It depicts a block diagram showing an example of a similarity degree derivation system of the second example embodiment of the present invention.

The second example embodiment is a more specific example embodiment of the first example embodiment. FIG. 3 is a block diagram showing an example of a similarity degree derivation system of the second example embodiment of the present invention. The similarity degree derivation system 1 of this example embodiment also includes a hash value calculation unit 2, a minimum hash value identification unit 3, and a similarity degree derivation unit 4. The minimum hash value identification unit 3 and the similarity degree derivation unit 4 are same as the minimum hash value identification unit 3 and the similarity degree derivation unit 4 in the first example embodiment.

The hash value calculation unit 2 includes a first hash value calculation unit 51, a whole set generation unit 52, an index information generation unit 53, a second hash value calculation unit 54, and a hash value determination unit 55.

The first hash value calculation unit 51 calculates a hash values by applying a predetermined hash function among the multiple hash functions to individual elements of each set in the multiple sets. The hash value obtained by the predetermined hash function is denoted as the first hash value. Therefore, the first hash value is calculated for each individual element of each set.

In the following, for simplicity of explanation, two sets A and B are focused on, but the number of sets may be three or more. It is assumed that the number of hash functions is m, and the individual hash functions are denoted as h1, h2, . . . , hm. Moreover, it assumed that h1 is the predetermined hash function described above.

One hash function from among the multiple hash functions may be defined in advance as the predetermined function. In this case, it is preferable to define the hash function with the widest range among the multiple hash functions as the predetermined hash function. In other words, it is preferable that the predetermined hash function is the hash function with the widest range among the multiple hash functions. In this example, the range of hash function h1 is the widest among the ranges of the multiple hash functions h1 to hm. This is the same in the aforementioned first example embodiment and the third example embodiment described below.

FIG. 4 is a schematic diagram showing an example of the first hash values obtained for each individual element of each set A and B. As shown in FIG. 4, the set A has four strings as elements and the set B has three strings as elements. The first hash value calculation unit 51 calculates the first hash value for these individual elements by the predetermined hash function h1. In FIG. 4, the values shown to the right of the individual elements are the first hash values.

The whole set generation unit 52 extracts only one element from multiple elements among each individual element of each set in multiple of sets whose first hash values match and which are equivalent, and extracts each element that does not correspond to the multiple elements, to generate one set that includes all types of elements without duplication. This set is hereinafter referred to as the whole set.

FIG. 5 is a schematic diagram showing the whole set obtained from the sets A and B shown in FIG. 4. As shown in FIG. 4, among the individual elements of each set, the multiple elements whose first hash values match and which are equivalent are "mountain" belonging to the set A and "mountain" belonging to the set B. The first hash values of these two elements match with "666" and the elements themselves match with "mountain". The whole set generation unit 52 extracts only one element from these two elements. In this case, "mountain" belonging to the set A may be extracted, or "mountain" belonging to the set B may be extracted. Then, the whole set generation unit 52 extracts each element ("the", "highest", "Fuji", "room", and "view") that does not correspond to the multiple elements whose first hash values match and which are equivalent ("mountain" belonging to the set A and "mountain" belonging to the set B). Then, the whole set generation unit 52 generates a set that includes each of the extracted elements as the whole set. In this example, as shown in FIG. 5, the whole set includes six strings ("the", "highest", "mountain", "Fuji", "room", and "view") as elements. Since the whole set generation unit 52 extracts elements from the sets A and B as described above, there is no duplication in elements belonging to the whole set, and the whole set includes all types of elements belonging to the sets A and B.

The index information generation unit 53 generates index information that indicates which elements in which set included in the multiple sets correspond to which elements in the whole set.

FIG. 6 is a schematic diagram showing an example of index information. An example of generating the index information illustrated in FIG. 6 is described below. The index information generation unit 53 assigns identification information to each element belonging to the whole set. In the example shown in FIG. 6, identification information from "1" to "6" is assigned to each element belonging to the whole set. The index information generation unit 53 generates index information for each element of each set in the multiple sets, which defines the identification information of the element in the whole set that corresponds to the element. In the example shown in FIG. 6, for example, the element "the" belonging to the set A has the index information "1".

This indicates that the element "the" belonging to the set A corresponds to the element to which the identification information "1" is assigned among the elements in the whole set. In the example shown in FIG. 6, the element "mountain" belonging to the set A and the element "mountain" belonging to the set B both correspond to the element to which the identification information "3" is assigned among the elements in the whole set. In other words, the element "mountain" belonging to the set A and the element "mountain" belonging to the set B correspond the same element in the whole set.

The second hash value calculation unit 54 applies each hash function (i.e., each hash function h2, ..., hm) other than the predetermined hash function (hash function h1 in this example) in the multiple hash functions (hash functions h1, h2, ..., hm) to each element in the whole set. Then, the second hash value calculation unit 54 calculates the hash value corresponding to each hash function h2, ..., hm for each element belonging to the whole set, respectively.

FIG. 7 is a schematic diagram showing an example of hash values corresponding to each hash function h2, ..., hm calculated by the second hash value calculation unit 54 for each element belonging to the whole set shown in FIG. 5.

The hash value determination unit 55 determines, based on the index information, by combining the first hash value (see FIG. 4) of an individual element of each set (in this example, the sets A and B) in the multiple sets and hash values (see FIG. 7) calculated by the second hash values calculation unit 54 corresponding to the first hash value, multiple hash values corresponding to the multiple hash functions h1, h2, ..., hm for the individual elements of each set.

In this example, for each element of each set, the index information is the information that defines the identification information of the element in the whole set that corresponds to the element (see FIG. 6). In addition, a first hash value is calculated for each element of each set by the first hash value calculation unit 51 (see FIG. 4). Furthermore, by the second hash value calculation unit 54, hash values corresponding to each hash function h2, ..., hm other than the predetermined hash function h1 are calculated for each element belonging to the whole set. Therefore, the hash value determination unit 55 can combine the first hash value of each individual element of each set with the hash values corresponding to each hash function h2, ..., hm calculated by the second hash value calculation unit 54, based on the index information. As a result, the hash value determination unit 55 can determine, for each individual element of each set, the multiple hash values corresponding to the multiple hash functions h1, h2, ..., hm.

FIG. 8 is a schematic diagram showing an example of the multiple hash values corresponding to the multiple hash functions h1, h2, ..., hm, determined for individual elements of each set (in this example, the sets A and B).

Thus, by the operations of the first hash value calculation unit 51, the whole set generation unit 52, the index information generation unit 53, the second hash value calculation unit 54, and the hash value determination unit 55, multiple hash values obtained by applying multiple hash functions to individual elements of each set are obtained. At this time, for multiple elements whose first hash values match and which are equivalent (in this example, "mountain" belonging to the set A and "mountain" belonging to the set B), the hash functions h2, ..., hm other than the predetermined hash function h1 are not calculated in duplicate. Specifically, for "mountain", the hash values corresponding to hash functions h2, ..., hm are calculated only once each by the second hash value calculation unit 54.

The minimum hash value identification unit 3 identifies the minimum hash value for each individual hash function with respect to each of the sets included in the multiple sets (in this example, the sets A and B). FIG. 9 is a schematic diagram showing the minimum hash value identified for each hash function for the sets A and B, respectively. For example, in the example shown in FIG. 9, the minimum hash value for hash function h1 in set A is 12, and the minimum hash value for hash function h2 is 56. Thus, the minimum hash value identification unit 3 identifies the minimum hash value for each hash function with respect to the set A. Furthermore, for each of the other sets, the minimum hash value identifier 3 identifies the minimum hash value for each hash function in the same way.

In FIG. 4 through FIG. 9, the case where the multiple sets are the two sets A and B was used as an example. Even when there are three or more sets given to the similarity degree derivation system 1, the operations of the first hash value calculation unit 51, the whole set generation unit 52, the index information generation unit 53, the second hash value calculation unit 54, the hash value determination unit 55, and the minimum hash value identification unit 3 are the same as those described above.

The hash value calculation unit 2, including the first hash value calculation unit 51, the whole set generation unit 52, the index information generation unit 53, the second hash value calculation unit 54, and the hash value determination unit 55, is realized, for example, by a CPU of a computer operating according to a similarity degree derivation program. For example, the CPU may read the similarity degree derivation program from a program storage medium such as a program storage device of the computer, and operate as the hash value calculation unit 2, including the first hash value calculation unit 51, the whole set generation unit 52, the index information generation unit 53, the second hash value calculation unit 54, the hash value determination unit 55 according to the similarity degree derivation program.

Figure 10:
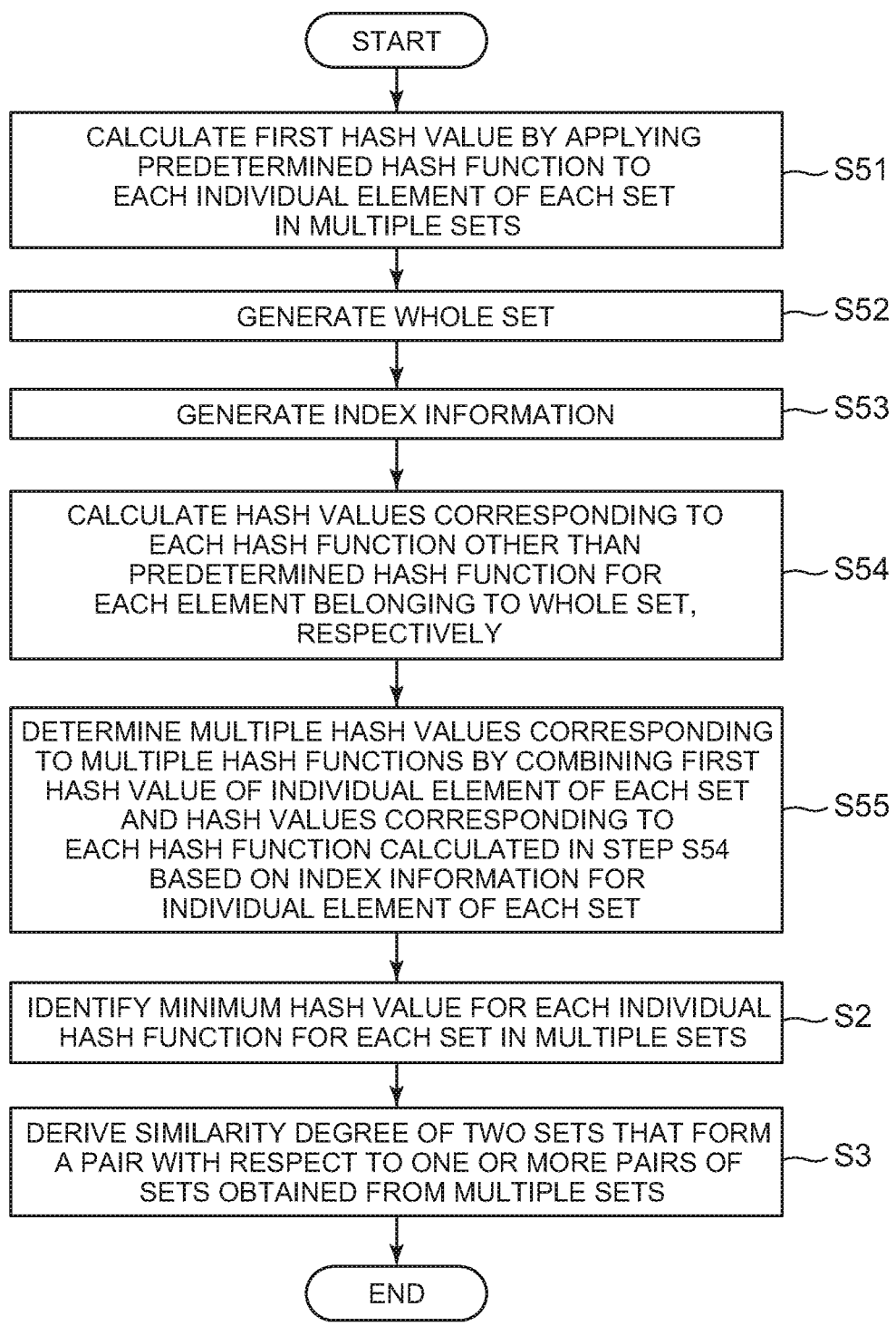
FIG. 10 It depicts a flowchart showing an example of the processing flow of the second example embodiment.

The following is an example of the processing flow of the second example embodiment. The explanation of matters that have already been explained are omitted as appropriate. FIG. 10 is a flowchart showing an example of the processing flow of the second example embodiment. As in the example above, it is assumed that the multiple hash functions are h1, h2, ..., hm, and that h1 is the predetermined hash function.

First, the first hash value calculation unit 51 calculates the first hash value by applying the predetermined hash function h1 to each individual element of each set in the multiple sets (step S51). As a result, the first hash value is obtained for each individual element of each set.

Next, the whole set generation unit 52 generates the whole set (step S52). In step S52, the whole set generation unit 52 extracts only one element from multiple elements among individual elements of each set whose first hash values match and which are equivalent, and extracts each element that does not correspond to the multiple elements, and defines one set including each extracted element as the whole set.

Next, the index information generation unit 53 generates the index information (step S53). For example, the index information generation unit 53 assigns identification information to each element in the whole set. Then, the index information generation unit 53 generates the index information for each element of each set included in the multiple sets, which defines the identification information of the element in the whole set that corresponds to the element.

Next, the second hash value calculation unit 54 calculates hash values corresponding to each hash function h2, ..., hm other than the predetermined hash function h1 for each element belonging to the whole set, respectively (step S54).

Next, the hash value determination unit 55 determines the multiple hash values corresponding to the multiple hash functions h1, h2, ..., hm by combining the first hash value of an individual element of each set and the hash values corresponding to each hash function h2, ..., hm calculated in step S54 based on the index information for individual element of each set (step S55). As a result of step S5, for example, the multiple hash values corresponding to multiple hash functions h1, h2, ..., hm are obtained for individual elements of each set, as illustrated in FIG. 8.

Steps S51 to S55 are an example of a more specific process of step S1 of the first example embodiment.

Next to step S55, the minimum hash value identification unit 3 identifies the minimum hash value for each individual hash function for each set in the multiple sets (step S2). As a result of step S2, for example, the minimum hash value is identified for each hash function with respect to each set, as illustrated in FIG. 9.

Next, the similarity degree derivation unit 4 derives the similarity degree of the two sets that form a pair with respect to one or more pairs of sets obtained from the multiple sets (step S3).

Steps S2 and S3 are same as steps S2 and S3 in the first example embodiment.

Figure 11:
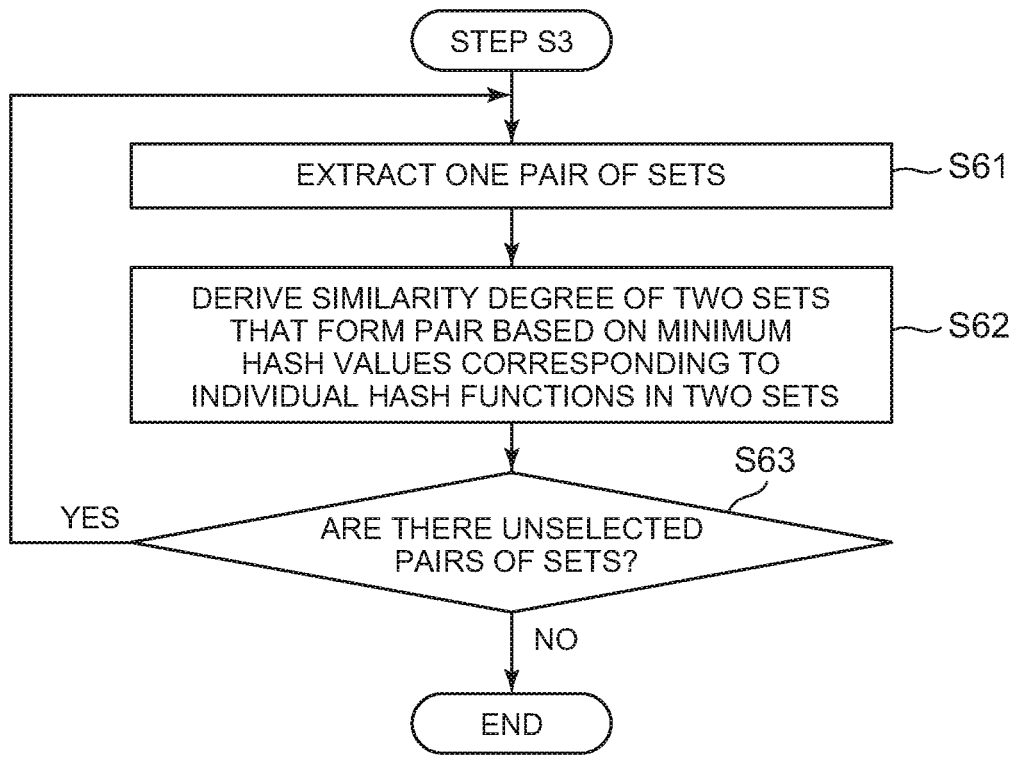
FIG. 11 It depicts a flowchart showing an example of a specific example of operation of step S3.

Step S3 is described more specifically below. FIG. 11 is a flowchart showing an example of a specific example of operation of step S3. The number of sets given to the similarity degree derivation system 1 may be two, three, or more. In the following explanation, the case in which the similarity degree derivation system 1 calculates the similarity degree of two sets that form a pair with respect to all pairs (pairs of sets) obtained from the given sets is shown. However, the similarity degree may be calculated only for pairs specified by the operator of the similarity degree derivation system 1, for example, out of all pairs obtained from given sets to the similarity degree derivation system 1.

The similarity degree derivation unit 4 extracts one pair of sets from the multiple sets (step S61). One pair consists of two sets. In step S61, the similarity degree derivation unit 4 also extracts one pair that has not yet been selected.

The similarity degree derivation unit 4 derives the similarity degree of the two sets that form the pair selected in step S61 based on the minimum hash values corresponding to the individual hash functions in the two sets (step S62). For example, the similarity degree derivation unit 4 may determine the number of matches between the minimum hash values corresponding to the individual hash functions for the two sets that form the pair (hereinafter referred to as the number of matches), as the similarity degree of the two sets that form the pair. For example, the similarity degree derivation unit 4 may determine the ratio of the number of matches to the number of hash functions as the similarity degree.

Next to step S62, the similarity degree derivation unit 4 determines whether or not there are unselected pairs of sets (step S63).

When there are unselected pairs of sets (Yes in step S63), then the similarity degree derivation unit 4 repeats the operation from step S61 onward.

When there are no unselected pairs of sets (No in step S63), then for all pairs, the similarity degree of the two sets that form the pair has been derived, and the process ends at that point.

According to this method, the whole set generation unit 52 extracts only one element from multiple elements among each individual element of each set whose first hash values match and which are equivalent, extracts each element that does not correspond to the multiple elements, and generates one whole set including each extracted element. Then, the second hash value calculation unit 54 calculates hash values corresponding to each hash function h2, ..., hm other than the predetermined hash function h1 for each element belonging to the whole set, respectively. Thus, for the multiple elements whose first hash values match and which are equivalent, the second hash value calculation unit 54 calculates the hash value corresponding to the hash function h2, ..., hm only once. Even if for each of such multiple elements, the calculation of the hash values corresponding to hash functions h2, ..., hm is performed, the same calculation is performed and the same hash values are obtained, but as described above, the second hash value calculation unit 54 performs the calculation corresponding to hash functions h2, ..., hm only once. Therefore, the same calculation is not duplicated, and the amount of calculation of hash values can be reduced when deriving the similarity degree of sets.

Example Embodiment 3

Figure 12:
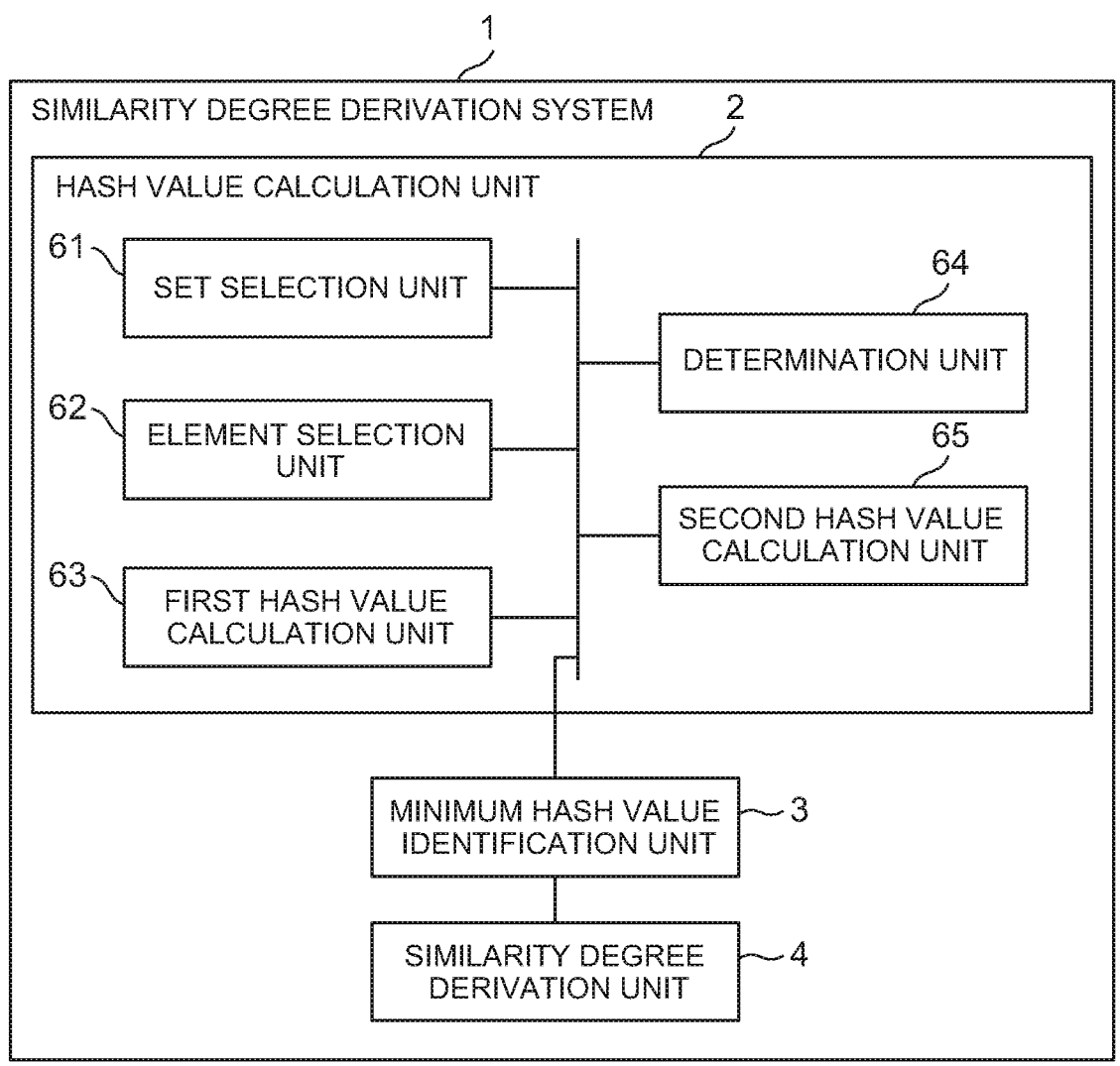
FIG. 12 It depicts a block diagram showing an example of a similarity degree derivation system of the third example embodiment of the present invention.

The third example embodiment is a more specific example embodiment of the first example embodiment. FIG. 12 is a block diagram showing an example of a similarity degree derivation system of the third example embodiment of the present invention. The similarity degree derivation system 1 of this example embodiment also includes a hash value calculation unit 2, a minimum hash value identification unit 3, and a similarity degree derivation unit 4. The minimum hash value identification unit 3 and the similarity degree derivation unit 4 are same as the minimum hash value identification unit 3 and the similarity degree derivation unit 4 in the first and second example embodiments.

In this example embodiment, as in the second example embodiment, it is assumed that the number of multiple hash functions is m, and the individual hash functions are denoted as h1, h2, ..., hm. Moreover, it assumed that h1 is the predetermined hash function.

As already explained, it is preferable to define the hash function with the widest range among the multiple hash functions as the predetermined hash function. In other words, it is preferable that the predetermined hash function is the hash function with the widest range among the multiple hash functions. In this example, the range of hash function h1 is the widest among the ranges of the multiple hash functions h1 to hm.

The hash value calculated with the predetermined hash function h1 is denoted as the first hash value.

The hash value calculation unit 2 of the third example embodiment includes a set selection unit 61, an element selection unit 62, a first hash value calculation unit 63, a determination unit 64, and a second hash value calculation unit 65. The operation of the first hash value calculation unit 63 and the second hash value calculation unit 65 in the third example embodiment is different from the operation of the first hash value calculation unit 51 and the second hash value calculation unit 54 in the second example embodiment.

The set selection unit 61 selects one set in turn from multiple sets.

The element selection unit 62 selects one element in turn from the set selected by the set selection unit 61.

The first hash value calculation unit 63 calculates the first hash value of the element selected by the element selection unit 62 by applying the predetermined hash function to the element.

The determination unit 64 determines whether or not an element whose first hash value matches the element selected by the element selection unit 62 and which matches the element is already selected.

Hereafter, an element whose first hash value matches the element selected by the element selection unit 62 and which matches the element is denoted as the matching element.

When the matching element has already been selected, the second hash value calculation unit 65 determines that the hash values corresponding to each hash function h2, ..., hm other than the predetermined hash function h1 of the element selected by the element selection unit 62 are identical to the hash values corresponding to each hash function h2, ..., hm of the matching element.

When the matching element hasn't been selected, the second hash value calculation unit 65 calculates the hash values corresponding to each hash function h2, ..., hm other than the predetermined hash function h1 of the element selected by the element selection unit 62.

The hash value calculation unit 2, including the set selection unit 61, the element selection unit 62, the first hash value calculation unit 63, the determination unit 64, and the second hash value calculation unit 65, is realized, for example, by a CPU of a computer operating according to a similarity degree derivation program. For example, the CPU may read the similarity degree derivation program from a program storage medium such as a program storage device of the computer, and operate as the hash value calculation unit 2, including the set selection unit 61, the element selection unit 62, the first hash value calculation unit 63, the determination unit 64, and the second hash value calculation unit 65.

Figure 13:
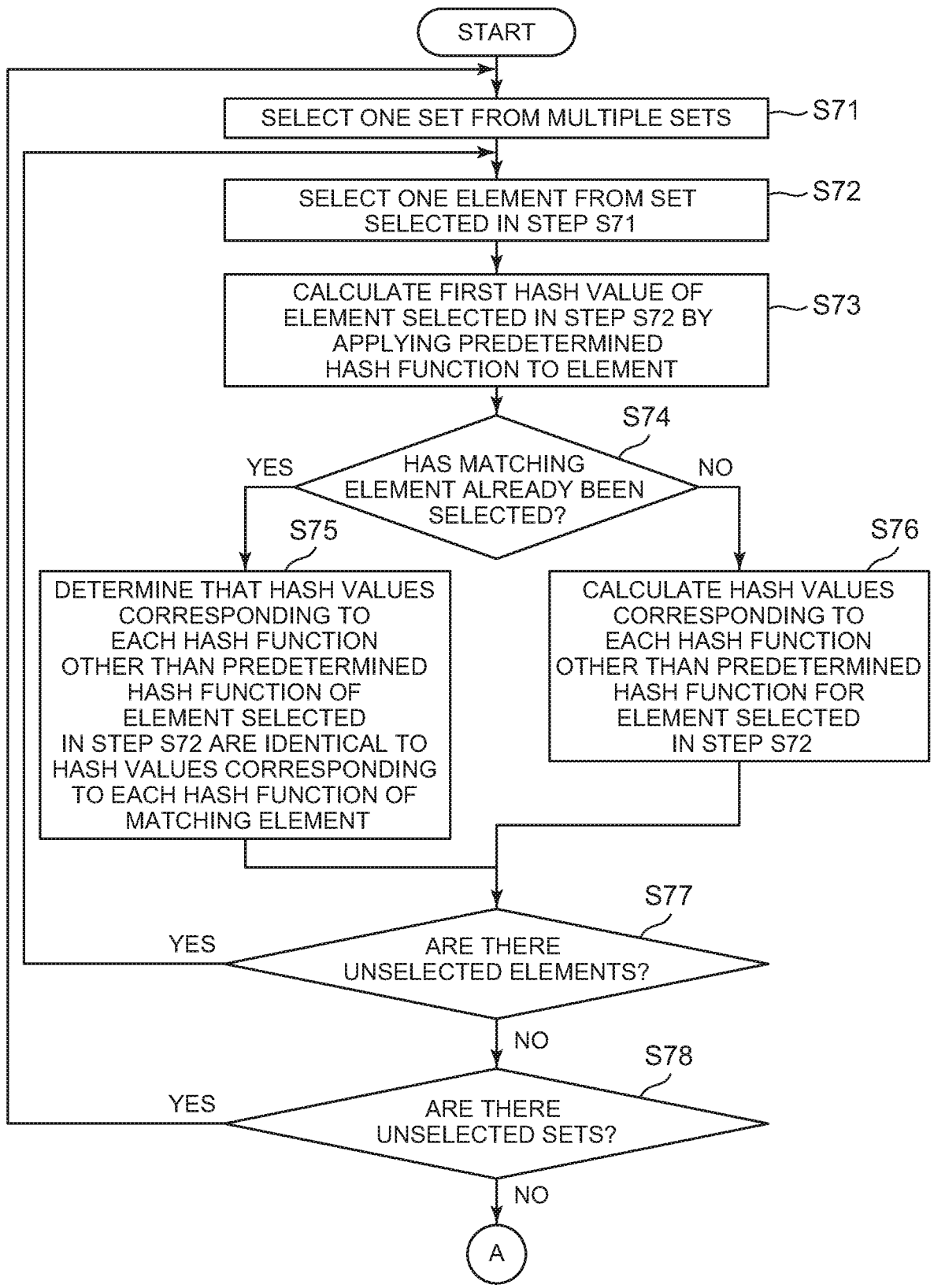
FIG. 13 It depicts a flowchart showing an example of the processing flow of the third example embodiment.
Figures 14, 15:
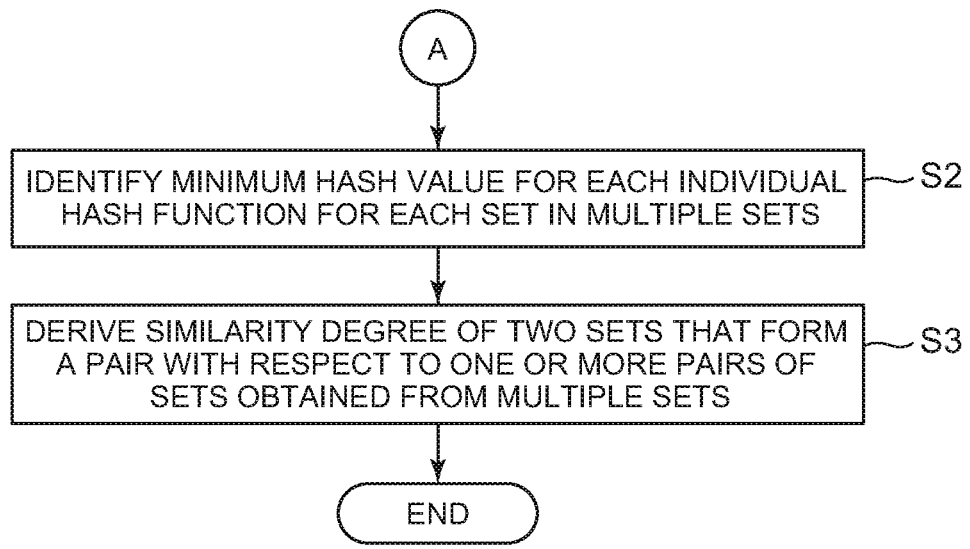
FIG. 14 It depicts a flowchart showing an example of the processing flow of the third example embodiment.
FIG. 15 It depicts a schematic diagram showing an example of one set in the multiple sets.

The following is an example of the processing flow of the third example embodiment. The explanation of matters that have already been explained are omitted as appropriate. FIG. 13 and FIG. 14 are flowcharts showing an example of the processing flow of the third example embodiment.

First, the set selection unit 61 selects one set from multiple sets (step S71). In step S71, the set selection unit 61 selects one set that has not yet been selected in the multiple sets.

In this example, the set shown in FIG. 15 is assumed to be selected. The set shown in FIG. 15 is hereafter referred to as the set A. FIG. 15 is a schematic diagram showing an example of one set in the multiple sets.

Next, the element selection unit 62 selects one element from the set selected in step S71 (step S72). In step S72, the element selector 62 selects one element that has not yet been selected. Here, it is assumed that the element "the" is selected from the set A.

Next, the first hash value calculation unit 63 calculates the first hash value of the element selected in step S72 by applying the predetermined hash function h1 to the element (step S73). FIG. 16 is a schematic diagram showing an example of a hash value obtained after first executing step S73. As shown in FIG. 16, at this point, the first hash value of the element "the" has been obtained, but no other hash values have been obtained.

After step S73, the determination unit 64 determines whether or not an element whose first hash value matches the element selected in step S72 and which matches the element (i.e., the matching element) has already been selected (step S74).

When the matching element has already been selected (Yes in step S74), the process moves to step S75, and when no matching element has been selected (No in step S74), the process moves to step S76. In this example, the element "the" in the set A is the first selected element, and no matching element is selected. Therefore, the process moves to step S76.

In step S76, the second hash value calculation unit 65 calculates hash values corresponding to each hash function h2, ..., hm other than the predetermined hash function h1 for the element selected in step S72. FIG. 17 is a schematic diagram showing an example of hash values obtained after first executing step S76. As shown in FIG. 17, at this point, hash values corresponding to multiple hash functions h1, h2 ..., hm of the element "the" have been obtained.

After executing step S75 or step S76, the element selection unit 62 determines whether or not there are unselected elements in the selected set (step S77). In this example, the element selection unit 62 determines that there are unselected elements in the selected set A (Yes in step S77). In this case, the process from step S72 onward is repeated.

Since the elements in the set A are all different elements (see FIG. 15), when the set A is selected, in step S74, it is determined that no matching elements have been selected and the process moves to step S76. FIG. 18 is a schematic diagram showing an example of hash values obtained before it is determined that there are no unselected elements in step S77.

When it is determined in step S77 that there are no unselected elements in the selected set (No in step S77), the process moves to step S78. In step S78, the set selection unit 61 determines whether or not there are unselected sets.

When it is determined that there is an unselected set (Yes in step S78), the process is repeated from step S71 onward. Here, it is assumed that set B shown in FIG. 19 has not yet been selected. FIG. 19 is a schematic diagram showing an example of one set in the multiple sets.

It is assumed that in step S71, the set selection unit 61 selects the set B, and in step S72, the element selection unit 62 selects the element "room" in the set B. Then, step S73 is executed. In this case, the matching element for the element "room" is not selected (No in step S74), so the process moves to step S76. As a result, the hash values corresponding to the multiple hash functions h1, h2 ..., hm of element "room" in the set B are obtained.

Next, in step S72, it is assumed that the element selection unit 62 selects the element "mountain" in the set B. Then, the first hash value calculation unit 63 calculates the first hash value of the element by applying the predetermined hash function to the element "mountain" in the set B (step S73). FIG. 20 is a schematic diagram showing an example of hash values obtained after the element "mountain" in the set B is selected and step S73 is executed.

Next, the determination unit 64 whether or not an element (i.e., a matching element) whose first hash value matches the element selected in step S72 (in this case, the element "mountain" in the set B) and which matches the element is already selected.

At this point, "the element "mountain" in the set A" has been selected, which is an element whose first hash value matches the element "mountain" in the set B and which matches the element (Yes in step S74). Therefore, the process moves to step S75. In this case, "the element "mountain" in the set A" corresponds to the matching element.

In step S75, the second hash value calculation unit 65 determines that the hash values corresponding to each hash function h2, . . . , hm other than the predetermined hash function h1 of "the element "mountain" in the set B" selected in step S72 are identical to the hash values corresponding to each hash function h2, . . . , hm of the matching element (the element "mountain" in the set A). FIG. 21 is a schematic diagram showing an example of hash values obtained after the execution of step S75 when the element "mountain" in the set B is selected.

Since there is an unselected element "view" (Yes in step S77), in step S72, the element selection unit 62 selects the element "view" in the set B, and repeats the process from step S73 onward. In this case, the matching element for the element "view" is not selected (No in step S74), and the process moves to step S76. As a result, hash values corresponding to the multiple hash functions h1, h2 . . . , hm of element "view" in the set B are obtained.

Here, all the elements in the set B have been selected (No in step S77), so the process moves to step S78. FIG. 22 is a schematic diagram showing an example of hash values obtained at this point.

It is assumed that in step S78, the determination unit 64 determines that there is no unselected set (No in step S78). In this case, the process moves to step S2 (see FIG. 14). The process up to the transition to step S2 (the process up to the determination that there is no unselected set in step S78) is an example of a more specific process of step S1 of the first example embodiment.

In step S2, the minimum hash value identification unit 3 identifies the minimum hash value for each individual hash function for each set in the multiple sets. In this example, it is assumed that the multiple sets are the two sets A and B. In this case, as a result of step S2, the minimum hash values are identified for each hash function with respect to each set, as illustrated in FIG. 9 shown in the second example embodiment.

Next to step S2, the similarity degree derivation unit 4 derives the similarity degree of the two sets that form a pair with respect to one or more pairs of sets obtained from the multiple sets (step S3).

Steps S2 and S3 are the same as steps S2 and S3 in the first and second example embodiments.

An example of the more specific operation of step S3 was described in the second example embodiment with reference to FIG. 11, so the explanation is omitted here.

According to this method, when the determination unit 64 determines that the matching element corresponding to the element selected in step S72 has already been selected (Yes in step S74), the process moves to step S75. The hash values corresponding to each hash function h2, . . . , hm of the matching element has already been calculated. Then, in step S75, the second hash value calculation unit 65 determines that the hash values corresponding to each hash function h2, . . . , hm of the element selected in step S72 are identical to the hash values corresponding to each hash function h2, . . . , hm of the matching element. The matching element corresponding to the element selected in step S72 matches the element selected in step S72. Therefore, in step S75, the second hash value calculation unit 65 can determine that the hash values corresponding to each hash function h2, . . . , hm of the element selected in step S72 are identical to the hash values corresponding to each hash function h2, . . . , hm of the matching element. Then, when the matching element corresponding to the element selected in step S72 has already been selected, the process moves to step S75. As a result, there is no need to calculate again the hash values corresponding to each hash function h2, . . . , hm that has already been calculated. Thus, the amount of calculation of hash values can be reduced when deriving the similarity degree of sets.

Next, a variant of each example embodiment is described. In this variant, each element of each set in the multiple sets is converted to a value (a hash value) by a hash function (denoted as h0), which is different from the multiple hash functions h1, h2, . . . , hm. This hash function h0 is referred to as the numeric hash function. For example, when each element of each set is a string, each element of each set is converted from a string to a value by applying the numeric hash function h0 to each string.

Then, the first, second, and third example embodiments above may be applied to each element of each set after the conversion. The amount of calculation of calculating the hash values of multiple hash functions for a numerical value is less than the amount of calculation of calculating the hash values of multiple hash functions for a string. Therefore, the amount of calculation can be reduced by converting each element of each set from strings to numerical values as described above.

However, each element after conversion by the numeric hash function h0 is a numerical value. In this case, in step S1 of the first example embodiment, the hash value calculation unit 2 may eliminate the duplication of multiple hash function calculations with respect to multiple elements whose hash values after conversion by the numeric hash function h0 match, and calculate multiple hash values for individual elements of each set.

When this variant is applied to the second example embodiment, the first hash value calculation unit 51 converts each element of each set into a numerical value using the numerical hash function h0. Then, the whole set generation unit 52 extracts only one element from multiple elements (elements after conversion) of each individual element of each set whose hash value after conversion by the numerical hash function h0 matches, and also extracts each element that does not correspond to the multiple elements, to generate one whole set that includes all types of elements without duplication. In this case, the second hash value calculation unit 54 calculates hash values corresponding to the multiple hash functions h1, h2, . . . , hm for each element belonging to the whole set, respectively. The hash value determination unit 55 determines the hash values corresponding to the multiple hash functions h1, h2, . . . , hm for each individual element of each set based on the index information.

When this variant is applied to the third example embodiment, in step S73, the first hash value calculation unit 63 applies the numeric hash function h0 to the element selected in step S72 to convert the element to a numeric element. In step S74, the determination unit 64 may determine an element that matches the element converted by the numeric hash function h0 as the matching element, and determine whether or not the matching element has already been obtained. When the matching element has not been obtained, then in step S76, the second hash value calculation unit 65 calculates each hash value corresponding to the multiple hash functions h1, h2, . . . , hm by applying the multiple hash functions h1, h2, . . . , hm to the converted element. When the matching element is obtained, in step S75, the second hash value calculation unit 65 determines that each hash value corresponding to the multiple hash functions h1, h2, . . . , hm for the converted element is identical to each hash value corresponding to the multiple hash functions h1, h2, . . . , hm for the matching element.

Figure 23:
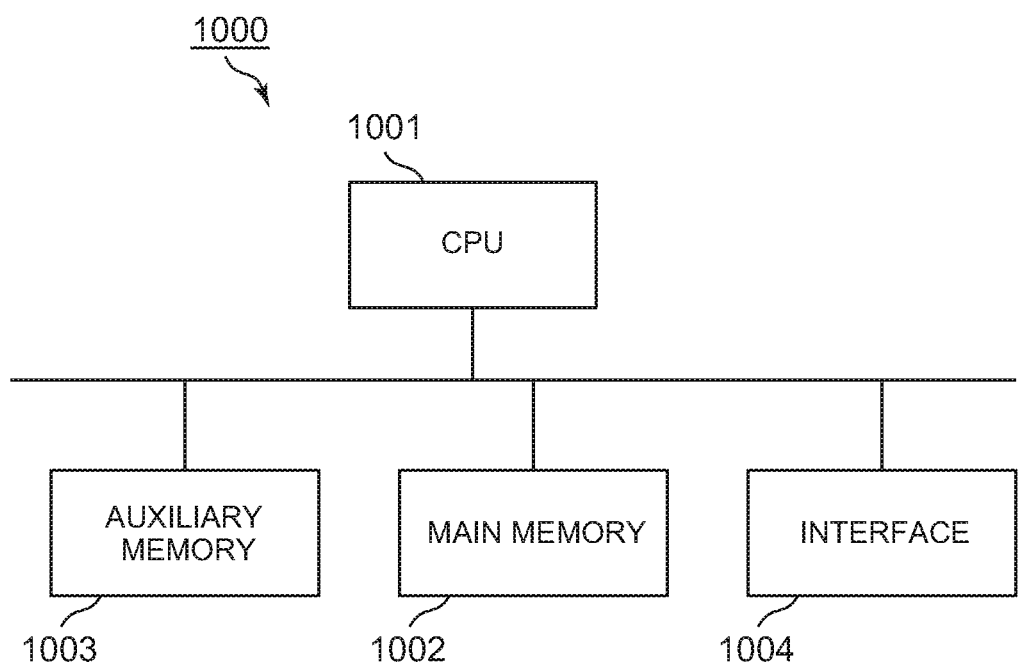
FIG. 23 It depicts a schematic block diagram showing an example of computer configuration related to the similarity degree derivation system 1 of the example embodiments of the present invention.

FIG. 23 is a schematic block diagram showing an example of computer configuration related to the similarity degree derivation system 1 of the example embodiments of the present invention. The computer 1000 includes a CPU 1001, a main memory 1002, an auxiliary memory 1003, and an interface 1004.

The similarity degree derivation system 1 of each example embodiment of the present invention is realized, for example, by a computer 1000. The operation of the similarity degree derivation system 1 is stored in the auxiliary memory 1003 in the form of a similarity degree derivation program. The CPU 1001 reads the similarity degree derivation program, expands the similarity degree derivation program in the main memory 1002, and executes the process described in each of the above example embodiments according to the similarity degree derivation program.

The auxiliary memory 1003 is an example of a non-transitory tangible medium. Other examples of non-transitory tangible media include magnetic disks connected via interface 1004, magneto-optical disks, CD-ROM (Compact Disk Read Only Memory), DVD-ROM (Digital Versatile Disk Read Only Memory), semiconductor memory, etc. When the program is delivered to the computer 1000 through a communication line, the computer 1000 may expand the program in the main memory 1002 and execute the process described in the above example embodiments according to the program.

Some or all of the components may be realized by general-purpose or dedicated circuitry, processor, or a combination of these. These may comprise a single chip or multiple chips connected via a bus. Some or all of the components may be realized by a combination of the above-mentioned circuitry, etc. and a program.

When some or all of components are realized by multiple information processing devices, circuits, etc., the multiple information processing devices, circuits, etc. may be centrally located or distributed. For example, the information processing devices and circuits may be realized as a client-and-server system, a cloud computing system, etc., each of which is connected via a communication network.

The above example embodiments of the present invention may also be described as the following supplementary notes, but are not limited to the following supplementary notes.

(Supplementary Note 1)
A similarity degree derivation system comprising:
hash value calculation means for, when obtaining multiple hash values obtained by applying multiple hash functions to individual elements of each set in multiple sets, obtaining the multiple hash values for individual elements of each set, eliminating duplicate calculations of each hash function other than a predetermined hash function among the multiple hash functions with respect to multiple elements whose hash values obtained by the predetermined hash function match and which are equivalent;
minimum hash value identification means for identifying minimum hash value which is the minimum value of hash values for each individual hash function, for each set in the multiple sets; and
similarity degree derivation means for deriving, with respect to one or more pairs of sets obtained from the multiple sets, similarity degree of two sets that form a pair based on minimum hash values corresponding to individual hash functions.

(Supplementary Note 2)
The similarity degree derivation system according to supplementary note 1,
wherein the hash value calculation means comprises:
first hash value calculation means for calculating first hash values by applying the predetermined hash function to individual elements of each set;
whole set generation means for extracting only one element from multiple elements among individual elements of each set whose first hash values match and which are equivalent, and extracting each element that does not correspond to the multiple elements, to generate whole set that is one set including all types of elements without duplication;
index information generation means for generating index information that indicates which elements in which set included in the multiple sets correspond to which elements in the whole set;
second hash value calculation means for calculating hash values corresponding to each hash function other than the predetermined hash function, by applying each hash function other than the predetermined hash function to each element in the whole set; and
hash value determination means for determining, based on the index information, by combining first hash value of each element of each set and hash values calculated by the second hash values calculation means corresponding to the first hash value, multiple hash values corresponding to the multiple hash functions.

(Supplementary Note 3)
The similarity degree derivation system according to supplementary note 1,
wherein the hash value calculation means comprises:
set selection means for selecting one set in turn from the multiple sets;
element selection means for selecting one element in turn from selected set;
first hash value calculation means for calculating first hash value of selected element by applying the predetermined hash function to the selected element;
determination means for determining whether or not matching element is already selected, that is an element whose first hash value matches the selected element and which matches the selected element; and
second hash value calculation means for,
when the matching element is already selected, determining that hash values corresponding to each hash function other than the predetermined hash function of the selected element are identical to hash values corresponding to each hash function other than the predetermined hash function of the matching element,
when the matching element is not selected, calculating the hash values corresponding to each hash function other than the predetermined hash function of the selected element.

(Supplementary Note 4)
The similarity degree derivation system according to any one of supplementary notes 1 to 3,
wherein the predetermined hash function is a hash function with the widest range among the multiple hash functions.

(Supplementary Note 5)
The similarity degree derivation system according to any one of supplementary notes 1 to 4,
wherein the similarity degree derivation means determines the number of matches between the minimum hash values corresponding to the individual hash functions for the two sets that form the pair, as the similarity degree of the two sets that form the pair.

(Supplementary Note 6)

A similarity degree derivation method comprising:

a hash value calculation process of, when obtaining multiple hash values obtained by applying multiple hash functions to individual elements of each set in multiple sets, obtaining the multiple hash values for individual elements of each set, eliminating duplicate calculations of each hash function other than a predetermined hash function among the multiple hash functions with respect to multiple elements whose hash values obtained by the predetermined hash function match and which are equivalent;

a minimum hash value identification process of identifying minimum hash value which is the minimum value of hash values for each individual hash function, for each set in the multiple sets; and a similarity degree derivation process of deriving, with respect to one or more pairs of sets obtained from the multiple sets, similarity degree of two sets that form a pair based on minimum hash values corresponding to individual hash functions.

(Supplementary Note 7)

The similarity degree derivation method according to supplementary note 6, wherein the hash value calculation process comprises:

a first hash value calculation process of calculating first hash values by applying the predetermined hash function to individual elements of each set;

a whole set generation process of extracting only one element from multiple elements among individual elements of each set whose first hash values match and which are equivalent, and extracting each element that does not correspond to the multiple elements, to generate whole set that is one set including all types of elements without duplication;

an index information generation process of generating index information that indicates which elements in which set included in the multiple sets correspond to which elements in the whole set;

a second hash value calculation process of calculating hash values corresponding to each hash function other than the predetermined hash function, by applying each hash function other than the predetermined hash function to each element in the whole set; and a hash value determination process of determining, based on the index information, by combining first hash value of each element of each set and hash values calculated in the second hash values calculation process corresponding to the first hash value, multiple hash values corresponding to the multiple hash functions.

(Supplementary Note 8)

The similarity degree derivation method according to supplementary note 6, wherein the hash value calculation process comprises:

a set selection process of selecting one set in turn from the multiple sets;

an element selection process of selecting one element in turn from selected set;

a first hash value calculation process of calculating first hash value of selected element by applying the predetermined hash function to the selected element;

a determination process of determining whether or not matching element is already selected, that is an element whose first hash value matches the selected element and which matches the selected element; and a second hash value calculation process of, when the matching element is already selected, determining that hash values corresponding to each hash function other than the predetermined hash function of the selected element are identical to hash values corresponding to each hash function other than the predetermined hash function of the matching element, when the matching element is not selected, calculating the hash values corresponding to each hash function other than the predetermined hash function of the selected element.

(Supplementary Note 9)

A computer-readable recording medium in which a similarity degree derivation program is recorded, wherein the similarity degree derivation program causes a computer to execute:

a hash value calculation process of, when obtaining multiple hash values obtained by applying multiple hash functions to individual elements of each set in multiple sets, obtaining the multiple hash values for individual elements of each set, eliminating duplicate calculations of each hash function other than a predetermined hash function among the multiple hash functions with respect to multiple elements whose hash values obtained by the predetermined hash function match and which are equivalent;

a minimum hash value identification process of identifying minimum hash value which is the minimum value of hash values for each individual hash function, for each set in the multiple sets; and a similarity degree derivation process of deriving, with respect to one or more pairs of sets obtained from the multiple sets, similarity degree of two sets that form a pair based on minimum hash values corresponding to individual hash functions.

(Supplementary Note 10)

The computer-readable recording medium in which the similarity degree derivation program is recorded, according to supplementary note 9 wherein, in the hash value calculation process, the similarity degree derivation program causes the computer to execute:

a first hash value calculation process of calculating first hash values by applying the predetermined hash function to individual elements of each set;

a whole set generation process of extracting only one element from multiple elements among individual elements of each set whose first hash values match and which are equivalent, and extracting each element that does not correspond to the multiple elements, to generate whole set that is one set including all types of elements without duplication;

an index information generation process of generating index information that indicates which elements in which set included in the multiple sets correspond to which elements in the whole set;

a second hash value calculation process of calculating hash values corresponding to each hash function other than the predetermined hash function, by applying each hash function other than the predetermined hash function to each element in the whole set; and a hash value determination process of determining, based on the index information, by combining first hash value of each element of each set and hash values calculated in the second hash values calculation process corresponding to the first hash value, multiple hash values corresponding to the multiple hash functions.

(Supplementary Note 11)

The computer-readable recording medium in which the similarity degree derivation program is recorded, according to supplementary note 9
wherein, in the hash value calculation process, the similarity degree derivation program causes the computer to execute:
a set selection process of selecting one set in turn from the multiple sets;
an element selection process of selecting one element in turn from selected set;
a first hash value calculation process of calculating first hash value of selected element by applying the predetermined hash function to the selected element;
a determination process of determining whether or not matching element is already selected, that is an element whose first hash value matches the selected element and which matches the selected element; and
a second hash value calculation process of,
when the matching element is already selected, determining that hash values corresponding to each hash function other than the predetermined hash function of the selected element are identical to hash values corresponding to each hash function other than the predetermined hash function of the matching element,
when the matching element is not selected, calculating the hash values corresponding to each hash function other than the predetermined hash function of the selected element.

Although the present invention has been described above with reference to the example embodiments, the present invention is not limited to the above example embodiments. Various changes can be made to the configuration and details of the present invention that can be understood by those skilled in the art within the scope of the present invention.

INDUSTRIAL APPLICABILITY

The invention is suitably applied to similarity degree derivation systems that derive similarity degree between sets.

REFERENCE SIGNS LIST

1 Similarity degree derivation system
2 Hash value calculation unit
3 Minimum hash value identification unit
4 Similarity degree derivation unit
51 First hash value calculation unit
52 Whole set generation unit
53 Index information generation unit
54 Second hash value calculation unit
55 Hash value determination unit
61 Set selection unit
62 Element selection unit
63 First hash value calculation unit
64 Determination unit
65 Second hash value calculation unit

What is claimed is:

1. A similarity degree derivation system comprising:
a memory configured to store instructions;
a processor configured to execute the instructions to:
when obtaining multiple hash values obtained by applying multiple hash functions to individual elements of each set in multiple sets, obtain the multiple hash values for individual elements of each set, eliminating duplicate calculations of each hash function other than a predetermined hash function among the multiple hash functions with respect to multiple elements whose hash values obtained by the predetermined hash function match and which are equivalent;
identify minimum hash value which is the minimum value of hash values for each individual hash function, for each set in the multiple sets; and
derive, with respect to one or more pairs of sets obtained from the multiple sets, similarity degree of two sets that form a pair based on minimum hash values corresponding to individual hash functions.

2. The similarity degree derivation system according to claim 1,
wherein
the processor calculates first hash values by applying the predetermined hash function to individual elements of each set;
the processor extracts only one element from multiple elements among individual elements of each set whose first hash values match and which are equivalent, and extracts each element that does not correspond to the multiple elements, to generate whole set that is one set including all types of elements without duplication;
the processor generates index information that indicates which elements in which set included in the multiple sets correspond to which elements in the whole set;
the processor calculates hash values corresponding to each hash function other than the predetermined hash function, by applying each hash function other than the predetermined hash function to each element in the whole set; and
the processor determines, based on the index information, by combining first hash value of each element of each set and hash values calculated by the processor corresponding to the first hash value, multiple hash values corresponding to the multiple hash functions.

3. The similarity degree derivation system according to claim 1,
wherein
the processor selects one set in turn from the multiple sets;
the processor selects one element in turn from selected set;
the processor calculates first hash value of selected element by applying the predetermined hash function to the selected element;
the processor determines whether or not matching element is already selected, that is an element whose first hash value matches the selected element and which matches the selected element; and
the processor
when the matching element is already selected, determines that hash values corresponding to each hash function other than the predetermined hash function of the selected element are identical to hash values corresponding to each hash function other than the predetermined hash function of the matching element,
when the matching element is not selected, calculates the hash values corresponding to each hash function other than the predetermined hash function of the selected element.

4. The similarity degree derivation system according to claim 1,
wherein the predetermined hash function is a hash function with the widest range among the multiple hash functions.

5. The similarity degree derivation system according to claim 1,
   wherein the processor determines the number of matches between the minimum hash values corresponding to the individual hash functions for the two sets that form the pair, as the similarity degree of the two sets that form the pair.

6. A similarity degree derivation method comprising:
   a hash value calculation process of, when obtaining multiple hash values obtained by applying multiple hash functions to individual elements of each set in multiple sets, obtaining the multiple hash values for individual elements of each set, eliminating duplicate calculations of each hash function other than a predetermined hash function among the multiple hash functions with respect to multiple elements whose hash values obtained by the predetermined hash function match and which are equivalent;
   a minimum hash value identification process of identifying minimum hash value which is the minimum value of hash values for each individual hash function, for each set in the multiple sets; and
   a similarity degree derivation process of deriving, with respect to one or more pairs of sets obtained from the multiple sets, similarity degree of two sets that form a pair based on minimum hash values corresponding to individual hash functions.

7. The similarity degree derivation method according to claim 6,
   wherein the hash value calculation process comprises:
   a first hash value calculation process of calculating first hash values by applying the predetermined hash function to individual elements of each set;
   a whole set generation process of extracting only one element from multiple elements among individual elements of each set whose first hash values match and which are equivalent, and extracting each element that does not correspond to the multiple elements, to generate whole set that is one set including all types of elements without duplication;
   an index information generation process of generating index information that indicates which elements in which set included in the multiple sets correspond to which elements in the whole set;
   a second hash value calculation process of calculating hash values corresponding to each hash function other than the predetermined hash function, by applying each hash function other than the predetermined hash function to each element in the whole set; and
   a hash value determination process of determining, based on the index information, by combining first hash value of each element of each set and hash values calculated in the second hash values calculation process corresponding to the first hash value, multiple hash values corresponding to the multiple hash functions.

8. The similarity degree derivation method according to claim 6,
   wherein the hash value calculation process comprises:
   a set selection process of selecting one set in turn from the multiple sets;
   an element selection process of selecting one element in turn from selected set;
   a first hash value calculation process of calculating first hash value of selected element by applying the predetermined hash function to the selected element;
   a determination process of determining whether or not matching element is already selected, that is an element whose first hash value matches the selected element and which matches the selected element; and
   a second hash value calculation process of,
   when the matching element is already selected, determining that hash values corresponding to each hash function other than the predetermined hash function of the selected element are identical to hash values corresponding to each hash function other than the predetermined hash function of the matching element,
   when the matching element is not selected, calculating the hash values corresponding to each hash function other than the predetermined hash function of the selected element.

9. A non-transitory computer-readable recording medium in which a similarity degree derivation program is recorded, wherein the similarity degree derivation program causes a computer to execute:
   a hash value calculation process of, when obtaining multiple hash values obtained by applying multiple hash functions to individual elements of each set in multiple sets, obtaining the multiple hash values for individual elements of each set, eliminating duplicate calculations of each hash function other than a predetermined hash function among the multiple hash functions with respect to multiple elements whose hash values obtained by the predetermined hash function match and which are equivalent;
   a minimum hash value identification process of identifying minimum hash value which is the minimum value of hash values for each individual hash function, for each set in the multiple sets; and
   a similarity degree derivation process of deriving, with respect to one or more pairs of sets obtained from the multiple sets, similarity degree of two sets that form a pair based on minimum hash values corresponding to individual hash functions.

10. The non-transitory computer-readable recording medium in which the similarity degree derivation program is recorded, according to claim 9
    wherein, in the hash value calculation process, the similarity degree derivation program causes the computer to execute:
    a first hash value calculation process of calculating first hash values by applying the predetermined hash function to individual elements of each set;
    a whole set generation process of extracting only one element from multiple elements among individual elements of each set whose first hash values match and which are equivalent, and extracting each element that does not correspond to the multiple elements, to generate whole set that is one set including all types of elements without duplication;
    an index information generation process of generating index information that indicates which elements in which set included in the multiple sets correspond to which elements in the whole set;
    a second hash value calculation process of calculating hash values corresponding to each hash function other than the predetermined hash function, by applying each hash function other than the predetermined hash function to each element in the whole set; and
    a hash value determination process of determining, based on the index information, by combining first hash value of each element of each set and hash values calculated in the second hash values calculation process corresponding to the first hash value, multiple hash values corresponding to the multiple hash functions.

11. The non-transitory computer-readable recording medium in which the similarity degree derivation program is recorded, according to claim 9
   wherein, in the hash value calculation process, the similarity degree derivation program causes the computer to execute:
   a set selection process of selecting one set in turn from the multiple sets;
   an element selection process of selecting one element in turn from selected set;
   a first hash value calculation process of calculating first hash value of selected element by applying the predetermined hash function to the selected element;
   a determination process of determining whether or not matching element is already selected, that is an element whose first hash value matches the selected element and which matches the selected element; and
   a second hash value calculation process of,
   when the matching element is already selected, determining that hash values corresponding to each hash function other than the predetermined hash function of the selected element are identical to hash values corresponding to each hash function other than the predetermined hash function of the matching element,
   when the matching element is not selected, calculating the hash values corresponding to each hash function other than the predetermined hash function of the selected element.

* * * * *